FIG. 17
FIG. 18
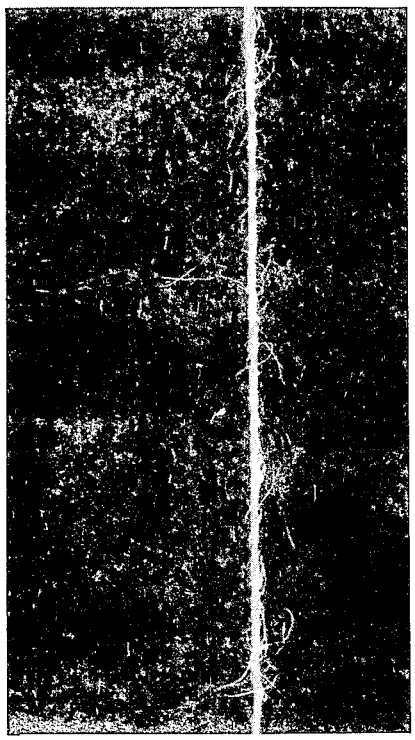
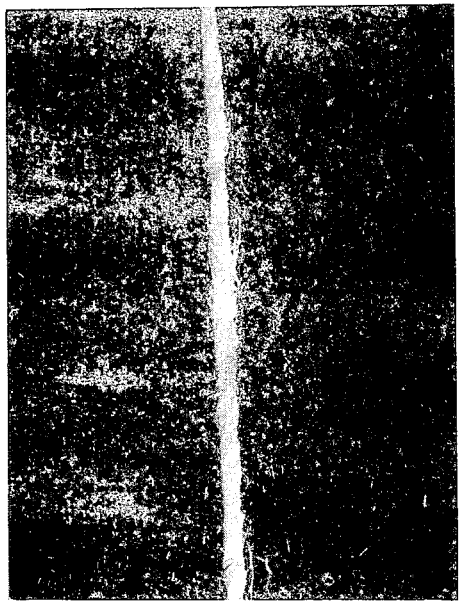
FIG. 19

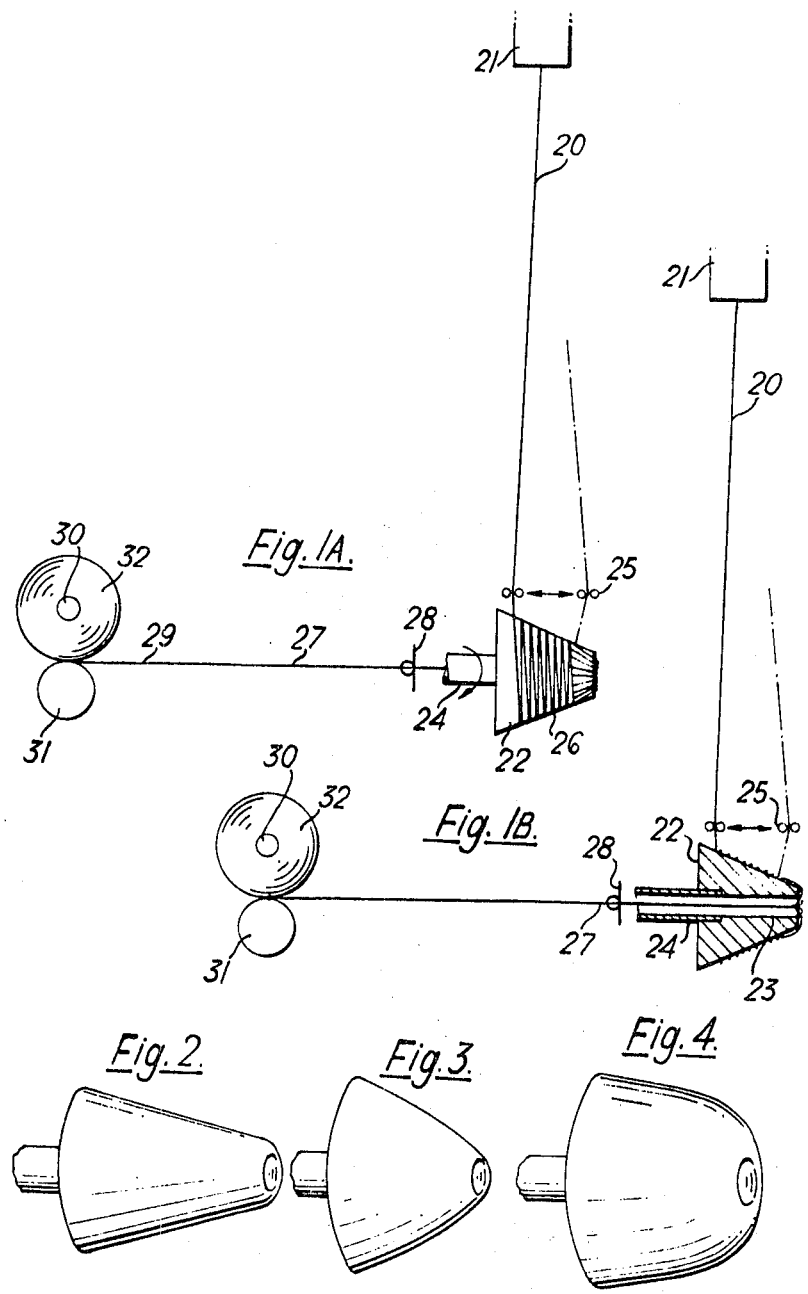

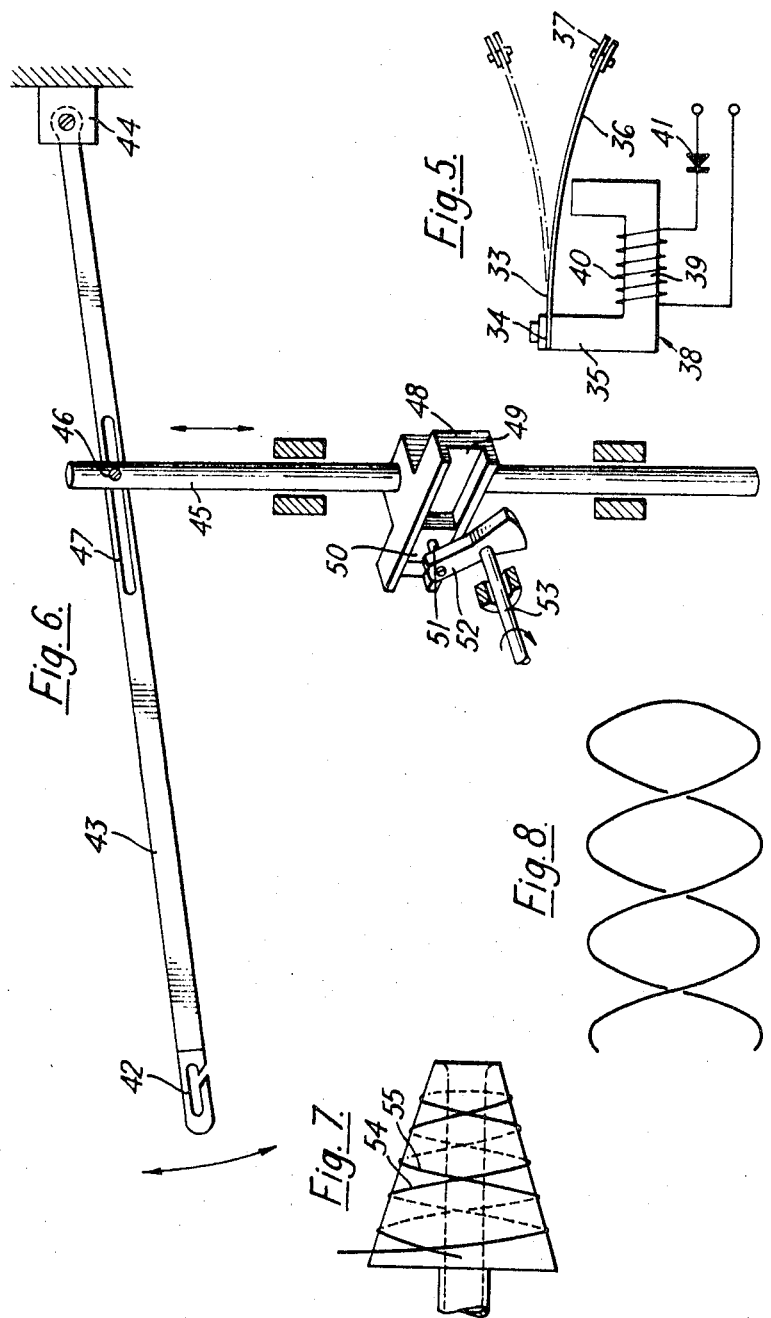

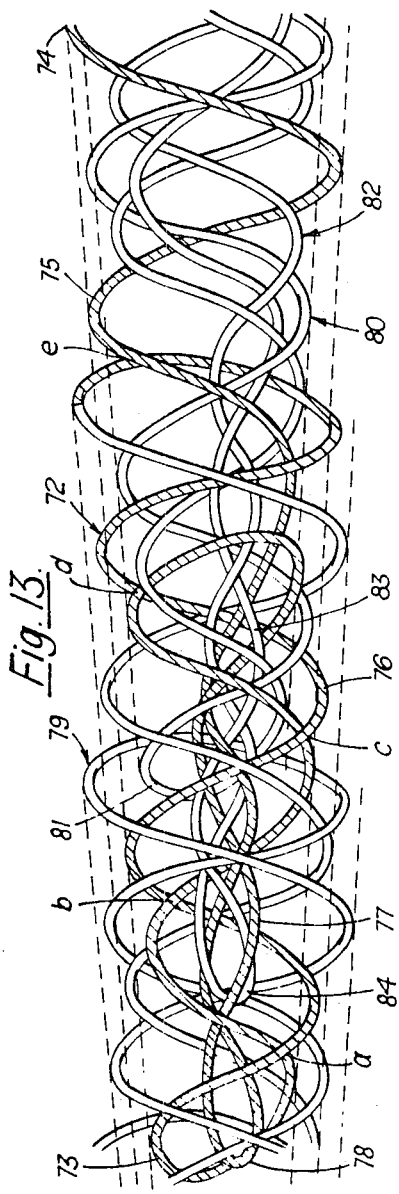
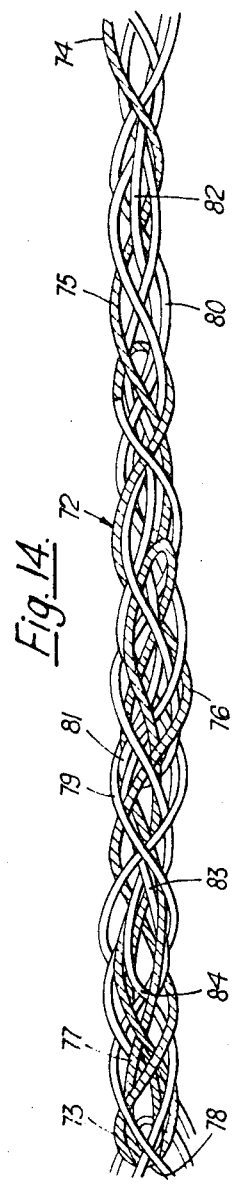

United States Patent Office 3,468,117
Patented Sept. 23, 1969

3,468,117
CONTINUOUS FILAMENT YARNS
Cyril G. Cannon, Usk, Barrie L. Davies, Langstone, Alan Selwood, Llanyravon, Cwmbran, and Roy A. Williams, Llansapley, England, assignors to British Nylon Spinners Limited, Pontypool, Monmouthshire, England
Filed June 18, 1965, Ser. No. 465,080
Claims priority, application Great Britain, June 19, 1964, 25,416/64
Int. Cl. D02g 3/02, 3/36
U.S. Cl. 57—140
3 Claims

ABSTRACT OF THE DISCLOSURE

A continuous filament yarn comprising a multiplicity of interconnected loops longitudinally arranged to form a core around which is wrapped stray loops which emerge from the core.

---

This invention relates to yarns containing one or more continuous filaments of a polymeric material, and to a process and apparatus used for making such yarns.

Filaments of polymeric material are most conveniently manufactured in the form of continuous filaments by wet, dry or melt-spinning processes. These continuous filaments, as conventionally made, are especially straight often smooth with a marked regularity. In yarns derived from such continuous filaments, these qualities facilitate the close packing of adjacent filaments so that the yarn is a relatively dense and compact structure. This compactness is reflected in several undesirable properties manifest by such continuous filament yarns, for instance, a poor covering power, poor heat insulation, a low degree of bulkiness and a somewhat cold handle, and these detract from the recognised advantageous properties such, for instance, as their often excellent strength. In contrast with continuous filament yarns those derived from staple length fibres have a relatively low strength but a better developed covering power, heat insulation and bulkiness, and a softer handle, it being generally accepted that the properties are owed to the presence therein of irregular length fibres and numerous discontinuities.

During the past decade or so, much research effort, as evinced by numerous publications, including many patent specifications, has been directed to imparting some of the desirable qualities of a spun staple fibre yarn to a continuous filament yarn, and many methods and devices have been proposed for modifying a continuous filament yarn to achieve this end.

These modified continuous filament yarns are typically made by processes which involve treating a filamentary bundle to crimp, loop or otherwise disperse, individual filaments therein and they are not ordinarily prepared in an operation fully integrated with the extrusion and making of the constituent continuous filaments.

One reason which may be advanced to account for this concerns the high linear speed of the extruded filaments, which is of the order of 4,000 feet per minute in the case of polyamide or polyester filaments. This high speed makes it difficult to treat the travelling filaments in an appropriate manner. Another reason is connected with the nature of many freshly spun filaments which, because of their low molecular orientation are generally of poor strength and consequently, are not suited for many textile purposes.

In the specification of our co-pending application for Letters Patent, Ser. No. 461,617, there is described and claimed inter alia a process for making novel continuous filament yarns from one or more continuous filaments which is fully integrated with the extrusion and formation of the constituent continuous filament or filaments.

The process involves passing one or more freshly spun continuous filaments to a rotating body, preferably tapering to one end, in such a manner that an approximately tubular sleeve comprising a series of interconnected layers is assembled around the surface of the body, continuously withdrawing the sleeve from the body in the direction of its axis of rotation, preferably at its tapered extremity and collecting the resulting yarn in an orderly manner. The speed at which the sleeve is withdrawn from the rotating body must not only be less than the body's peripheral speed but also its rotational speed to provide for the insertion of twist in the yarn.

Each layer in the sleeve built up around the surface of the rotating body comprises two serially connected helices of opposite hand and when the sleeve is moved off the surface of the body, the two connected helices in a layer collapse in one direction and are simultaneously elongated in the direction of withdrawal thereby forming a long loop of complex structure. Consequently, the yarn which is derived from the sleeve comprises a multiplicity of essentially axially-extending loops, the majority of which, because the sleeve is withdrawn in an orderly and progressive manner with layers moving off the surface in the order in which they were assembled thereon, are contained for at least part of their length within another loop. This arrangement of axially-extending loops is one factor which provides the yarns with their excellent bulk characteristics. However, in addition to this nest of axially-extending loops, the yarn always contains a variable number of generally shorter length loops which emerge from the nest of aligned loops, and which often project outwardly therefrom in radial directions. These shorter length radially-projecting loops are considered to be derived primarily from loosely wrapped turns of the helices when present in the sleeve and which, under the influence of the centrifugal force, arising from the rotation of the body, are thrown outwardly from the surface thereof. These radially projecting loops are often so numerous that they provide the yarn with a distinct peripheral region and a hairy or fuzzy appearance.

The presence in the yarn of these radially projecting loops, particularly when present in relatively large numbers, imparts to the yarn certain undesirable properties. For instance, yarns containing relatively large numbers of these radially-projecting loops have an irregular, fimbriated surface and a certain lack of uniformity in cross-section. Furthermore, fabrics made from the yarns shown some tendency to pill and may have a "catchy" feel attributable to the loops catching in the fingers.

If it were possible to minimise the extent to which these radially projecting loops occur, while still retaining the arrangement of axially-extending interconnected loops thereby providing the desirably high bulk, the utility of the continuous filament yarns would be correspondingly enhanced.

It is an object of this invention to provide a continuous filament yarn which comprises a multiplicity of essentially axially-extending interconnected loops which, without being subjected to any treatment subsequent to its formation, contains a reduced content of radially-projecting loops and a superior cross-sectional uniformity compared with the continuous filament yarns made by process described and claimed in the specification of the aforementioned co-pending application.

The reduction in the content of radially projecting loops in the yarns of this invention is generally apparent both visually and tactually, and is possible to determine the actual content of radially-projecting loops in both types of yarn and thereby express the reduction in absolute terms. However, it will be appreciated that, because of the fineness of the loops and the numbers involved, particularly in one kind of yarn, the direct determination of the actual content of radially-projecting loops is a tedious and time-consuming operation which is not practicable for rapid and convenient measurement on long lengths of the yarn. A very simple and convenient method of ascertaining the content, in a given yarn, of radially-projecting loops is to measure the air drag of the yarn. Thus, although we recognise that the air drag of a yarn is a complex phenomenon influenced by many variable factors in addition to the content of radially-projecting loops, we have found that, provided an appropriate correction is made for the effect of denier thereon, the air drag of a yarn affords a reliable indication of the content of radially-projecting loops. Throughout this specification and claims the content of radially-projecting loops will be expressed by means of the air drag factor of the yarn in which they are present.

Accordingly, the present invention provides a continuous filament yarn which comprises a multiplicity of interconnected loops which are arranged essentially parallel to the longitudinal axis of the yarn, characterised in that the yarn possesses an air drag factor as herein defined of at least 7.5.

The yarn is further characterised by possessing a bulk factor of not less than 1.3 and a twist factor of at least ¾.

The continuous filament yarn of this invention may consist almost entirely of an array of interconnected loops which are aligned essentially parallel to the long axis of the structure, with a majority of the loops contained for at least part of their length within another loop. Alternatively, the yarn may comprise a relatively compact array of axially-extending interconnected loops, the majority of which are contained for at least part of their length within another loop, and a number of generally shorter length loops which emerge from the relatively compact array and which are wrapped around it to form a discontinuous sheath.

While the number of radially projecting loops is very much reduced in the yarn of this invention when compared with yarns resulting from the process described and claimed in the specification of the aforementioned application, they are generally still present, although their number is never sufficient to impart to the yarn an air drag factor in excess of 6.

DEFINITIONS

The air drag factor is derived from the measured air drag of the yarn by applying thereto an appropriate correction for the observed increase in the air drag with increasing denier, and it is computed by the following formula:

$$\text{Air drag factor} = \frac{(\text{Measured air drag})^4 \times \text{denier}}{10^2}$$

The air drag of a yarn can conveniently be measured by incorporating a length of the yarn in a pendulum arrangement, and determining the number of swings which occur between two amplitudes on one side as the oscillatory movement of the pendulum is damped. The pendulum comprises a 2 metre length of yarn clamped at one end and with a 4 gm. weight attached to its opposite end. The pendulum is then set in motion with approximately the same impetus on each occasion and the number of times the pendulum swings to one side between an amplitude of 30 and 20° is determined. The more effective the damping of the pendulum, the fewer will be the number of swings between the two amplitudes. The number of swings which occur between the two amplitudes is the measured air drag.

BULK FACTOR

This is defined as the percentage change in the diameter of the yarn on the application thereto of a given load, and it can conveniently be determined by means of a conventional calibrated thickness gauge. In this specification and claims, the bulk factors quoted are determined in the following manner.

Five turns of the yarn are wound under a tension of 0.01 gm. per denier around a flat plate 1 mm. thick and 10 cms. long, with the loops of the winding spaced apart a distance of 2½ mm. The plate is supported on the stage (¾ inch diameter) of a conventional calibrated thickness gauge with the loops of the yarn lying symmetrically across the stage. The top plate (¾ inch diameter) of the gauge was then lowered onto the yarn under a load of 10 gms. and the gauge reading taken at a steady value. This reading indicates the approximate initial thickness of the yarn, the low weight having little effect on the yarn, apart from flattening any surface irregularity, but being necessary to obtain a reading.

The loading is then increased to 50 gms. and the gauge is again read when steady. From the two readings on the thickness gauge, the percentage decrease in diameter, which results from the application of the 50 gm. load, is determined. This percentage decrease is related to the void volume present in the yarn, and hence is an indication of its bulkiness, for the more voids present therein the greater will be the decrease in diameter on the application of the 50 gm. load. The percentage decrease in diameter is relatively high for the bulky yarns of this invention, which have a complex structure, and it is much less for continuous filament yarns wherein the individual filaments are closely packed and consequently there is little void volume.

TWIST FACTOR

This is defined (see, for instance, "Textile Terms and Definitions," 4th edition, published by the Textile Institute, Manchester) as the actual twist divided by the square root of the cotton count. The relationship between the cotton count and yarn denier is well known and a denier value can readily be converted into the corresponding cotton count.

The present invention further provides a process for making a continuous filament yarn which comprises forming a continuous filament by the extrusion of a polymeric material, passing the continuous filament so formed to a rotating body around the surface of which the filament is wrapped, and having a peripheral speed which is sufficient to apply tension to, and to attenuate the continuous filament being passed thereto, importing to the filament in the course of its passage to the body a reciprocating movement whereby the filament is wrapped around the body in the form of a sleeve, continuously withdrawing the sleeve from the surface of the rotatable body at a speed which is less than the peripheral speed of the body, everting the sleeve, and collecting the yarn so formed in an orderly manner.

The sleeve may be everted simultaneously with, or subsequently to, its withdrawal from the surface of the body. However, it is most convenient to evert the sleeve more or less simultaneously with its withdrawal from the body and this may be effected by moving the sleeve along the surface of the body so that its direction of forward movement is essentially parallel to the rotational axis of the body and then, as the sleeve leaves the surface of the body, pulling it in the opposite direction through a passage contained within the body.

The generally relatively short loop which normally project outwardly from the main mass of the sleeve, and which are occasioned by the centrifugal force due to the rotation of the body, are transferred, as a result of the eversion, from the periphery to the interior and consequently the resulting yarn possesses a more regular and smooth surface, a more attractive hand or feel, a superior uniformity in cross-section and a reduced air drag when compared with a yarn derived from a sleeve which is not turned inside out.

The speed at which the sleeve is withdrawn from the rotating body must be less than the peripheral speed of the body, to allow a sleeve to accumulate thereon. Moreover, the insertion of twist which is necessary for the stabilisation and consolidation of the resulting yarn implies that the speed of withdrawal must always be less than the rotational speed of the body. Normally in the operation of the process of this invention, because the rotating body is desirably of a relatively small size, the peripheral speed is less than the rotational speed, in which event the former speed sets an upper limit on the speed of withdrawal. Whenever the peripheral speed exceeds the rotational speed, then the latter sets an upper limit on the speed of withdrawal.

While the formation of a bulky continuous filament yarn from only one filament is a noteworthy point about the process of this invention, and the use of one filament may be desirable on economic grounds or to provide a yarn which has a desired final denier, many more filaments than one may simultaneously be passed to the rotating body and assembled directly into a continuous filament yarn.

As the denier of the continuous filament yarn increases with the number of filaments constituting it, there is an upper limit on the number of filaments which can be assembled into a yarn compatible with the formation of a yarn acceptable for normal textile purposes.

For most purposes, the number of filaments being simultaneously passed to the rotating body does not exceed 50, although this will vary somewhat according to the actual denier of the filaments.

The present invention also provides an apparatus for making a yarn which comprises means for extruding a polymeric material into one or more continuous filaments, a traverse mechanism located some distance away from the extrusion means and arranged to impart a reciprocating movement to the filament, a body arranged to rotate with a peripheral speed sufficiently high to apply tension to the filament and to assemble the filament around its surface in the form of a sleeve, means for withdrawing the sleeve from the surface of the body at a slower speed than the peripheral speed thereof, means for everting the sleeve simultaneously with, or subsequently to, its withdrawal from the surface, and means for collecting the yarn so formed.

In a convenient form of the apparatus in accordance with this invention. the rotatable body contains an axially-extending passage and the sleeve is everted by pulling it therethrough in a direction opposite to the direction of forward movement of the sleeve as it moves along the surface of the rotatable body during its withdrawal. The same means which operates on the sleeve to withdraw it from the surface of the body may serve to pull it through the axially-extending passage and may further serve to collect the yarn that is formed.

The term "continuous flaments" as used herein and in the claiming clauses hereof refers to filaments which are of an indefinite length and which in the practise of the process of this invention are continuously supplied by extrusion from a source of the polymeric material. The term does not include short length fibres, commonly referred to as staple fibres.

In a preferred way of putting into practise this invention, continuous filaments are extruded through the orifices in a spinneret from a source of the polymeric material and one or more of the continuous filaments are passed along a generally defined path, most usually downwards, until they have substantially completely solidified, when they are lead through a traverse mechanism and then onto the rotating body around which the filaments are wrapped in the form of a sleeve comprising a number of overlaid and interconnected helices.

The sleeve is continuously moved along the surface of the rotating body so that the direction of its forward movement is essentially parallel to the axis of rotation and, more or less simultaneously with its movement off the surface of the body, its direction of forward movement in reversed and it is pulled through an axially-extending passage contained in the rotating body. The reversal of the direction of movement in this manner everts the sleeve and transfers the loops which project outwards from the main mass of the sleeve when it is assembled around the rotating body to the interior of the structure which is pulled through the passage.

The withdrawal of the sleeve from the surface of the body, and the pulling of its through the passage, is conveniently effected by a constant speed wind-up device, which operates at a speed less than the peripheral speed of the body and which collects the yarn formed from the sleeve which is pulled therethrough. The sleeve, whilst it is continuously propagated by the filaments being passed to the rotating body, is also continuously pulled off the surface of the body in a progressive and controlled manner, so that the sleeve can be regarded as a transient assembly of wrapped filaments.

The rotating body may have a variety of shapes although it is preferred that it should be profiled so as to taper in the direction in which the sleeve is moved thereof, for this facilitates the withdrawal of the sleeve as a coherent, integrated structure which is important in conveying to the yarn some of its characteristic features and properties. Particularly suitable rotating bodies are these which have a configuration described by a straight line generator. Examples include bodies which are conical or frusto-conical or essentially cylindrical in shape. In the context of cylindrically shaped bodies we mention that there has been used with conspicuous success a body of cylindrical form which tapers ever so slightly (an angle of about 5°) toward the direction in which the sleeve is moved off it.

Bodies of an essentially hemispherical or parabolic shape may also be employed in this invention.

The body may be constructed of metal, plastics, ceramic or any other suitable material. Conveniently, the body is provided with an integral shaft, which may be hollow, to provide for its connection to a suitable drive means.

The passage when present in the body to facilitate the essential eversion of the sleeve is preferably arranged axially within it i.e. it extends across the body in the plane of its axis. The passage must have a diameter sufficiently large to accommodate the sleeve which is pulled therethrough.

The peripheral speed i.e. surface speed of the rotating body around which the filament is wrapped in the form of superimposed and interconnected helices, must be of a magnitude such that the body imparts tension to the filament passing thereto. The application of tension to the filament by the rotating body attenuates it in the distance between the spinneret face and the point where the filament is substantially completely solidified. Furthermore, under the impetus imposed by the rotating body the filament is accelerated as it passes to the body. Accordingly, the spinning speed of the filament, which is the speed of the filament at a point after solidification is substantially complete and attenuation with a reduction in denier of the filament has well-nigh ceased, is directly dependent upon the peripheral speed of the rotating body. Hence, the spinning speed of the filament can be controlled in a direct and effective manner. Filaments of certain polymeric materials, particularly filaments derived from synthetic organic polymeric materials such, for example, as polyamides, polyesters, polyhydrocarbons, polyurethanes, polycarbonates and the like, are macromolecularly oriented as well as attenuated and accelerated by the rotating body. The degree of orientation developed in the freshly spun filaments is related to the peripheral rotational speed in the sense that the greater the speed, up to a certain variable limit, the more effective the orientation. Consequently, when synthetic organic polymeric materials are utilised in this invention, spinning and drawing can be accomplished in a single operation and the yarn formed from the sleeve withdrawn from the rotating body will contain drawn continuous filaments.

The effect of different peripheral speeds on the attenuation, acceleration and, where appropriate, macromolecular orientation, of filaments passing to the body, will be more fully described at a later passage in this specification, but we point out at this stage that peripheral speeds of less than 7,000 feet per minute are generally associated with yarns of somewhat inferior properties to those which are obtained using bodies with a higher speed, and the spinning speed of the filaments is correspondingly low, thereby resulting in a generally poor productivity.

As the traverse mechanism, there may be employed any device capable of imparting to the travelling filament a reciprocating, to-and-fro motion in a manner which spreads the filament along the length of the rotating body in a series of superimposed and interconnected helices. Particularly suitable traverse mechanism are those wherein the filament passes through a thread guide contained in a traverse bar to which a reciprocating movement is imparted by mechanical, hydraulic, electromagnetic or other suitable means.

The desirably high peripheral speeds for the rotating body impose a lower limit on the traverse (frequency) consistent with the satisfactory operation of the process and the formation of a yarn with good properties. This lower limit for the traverse speed varies over a wide range in dependence upon a number of variable factors including the peripheral speed of the rotating body. It is preferred to use traverse speeds which are high relative to those normally employed in the winding of continuous filaments into packages in a continuous filament spinning machine. In the latter role, the traverse speed does not ordinarily exceed much above 500 cycles per minute. In contrast thereto, the traverse speeds which in this invention are conducive to the smooth operation of the process and the formation of a yarn with maximum utility, are generally over 600 cycles per minute and preferably over 1000 cycles per minute, when the traverse mechanisms are used in conjunction with rotating bodies having peripheral speeds between 7,000 and 20,000 feet per minute.

Somewhat lower traverse speeds are acceptable when the peripheral speed of the rotating body is less than 7,000 feet per minute.

The invention will be more readily undestood by referring to the accompanying drawings wherein;

FIGURES 1A and B show different schematic representations of the same apparatus assembly which is useful in practicing the invention;

FIGURES 2–4 show perspective views of differently shaped bodies which may be used as the rotatable body in the apparatus of FIGURE 1.

FIGURE 5 shows in plan view one traverse mechanism which may be used in the apparatus of FIGURE 1;

FIGURE 6 shows an alternative traverse mechanism which may be used in the apparatus of FIGURE 1;

FIGURE 7 is a diagrammatic representation of the configuration adopted by a filament when wrapped as a layer around the rotatable body;

FIGURE 8 is a developed plan of the configuration shown in FIGURE 7;

FIGURE 13 is a diagrammatic view at a greatly enlarged scale of a section of the strand of loops derived from the sleeve after it has moved off the rotatable body and it illustrates the relationship between the various loops of which it is comprised and the structure of the individual loops;

FIGURE 14 is a diagrammatic view similar to that of FIGURE 13 but at a reduced scale and it illustrates how the various loops interact to produce a more complex and compact structure than that indicated in the previous figure;

Figure 20:
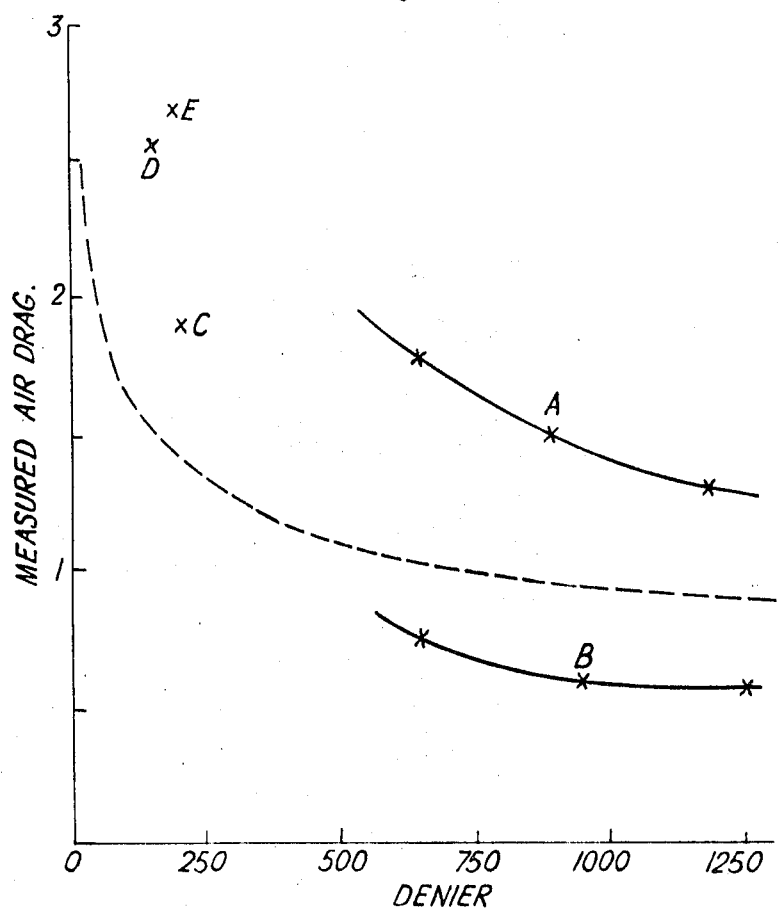

FIGURES 17–19 are photomicrographs at a magnification of 10× of length of yarn made in accordance with the procedure set forth in various examples hereinafter; and FIGURE 20 is a graph showing how the air drag measured in the manner herein described, increases with the denier of the yarn and it also affords a comparison between the air drag of yarns of this invention, corresponding spun staple yarns and yarns obtained by the process described and claimed in the specification of the aforementioned application.

Referring to FIGURES 1A and B, a freshly formed continuous filament indicated by reference numeral 20, is extruded through an orifice (not shown) in a spinneret 21 into room temperature air. The extruded filament after cooling and solidifying in the course of its downward passage through the air is wrapped around the continuous surface of a body 22 which is in the form of a truncated cone. The body 22 contains an axially extending passage 23, which is formed by drilling a ½ inch diameter hole through the body from the nose to the skirt in the plane of its longitudinal axis. The body also contains an integral hollow shaft 24 which is connected to a suitable drive mechanism (not shown) by means of which the body is rotated. The peripheral speed i.e. surface speed of the rotating body, which will hereinafter for convenience be referred to as a godet, is sufficiently high for the purpose of applying tension to the filament and thereby to attenuate it during its passage between the spinneret and the godet. The continuous filament during its downward travel is passed through the thread guide (not shown) of a traverse mechanism, generally indicated by reference numeral 25, which is located a short distance above the godet surface. The traverse mechanism imparts to the travelling filament a reciprocating, to-and-fro movement in a plane normal to the mean direction of filament travel and parallel to the longitudinal axis of the godet 22. As a result of the reciprocating movement imparted to it the filament is wound back and forth across the surface of the godet, from the skirt to the nose thereof, as a series of interconnected helices, which accumulate thereon in the form of a tapered tubular sleeve 26. The sleeve, while being propagated by the wrapping of the continously advancing filament, is progressively pulled down the inclined surface of the godet, and then through the passage 23 therein, under the impetus imposed by a conventional windup arrangement.

The reversal of the direction of forward movement which occurs more or less simultaneously with the removal of the sleeve from the surface of the godet, effects eversion of the sleeve. Arising from the eversion of the sleeve, the relatively short length loops projecting outwardly from the main mass thereof when on the godet, and which are formed primarily by the action of the centrifugal force on loosely wrapped turns of the helices, are transferred from the periphery to the interior.

The removal of the sleeve from the surface of the godet and its movement down the passage is associated not only with its eversion, but its collapse, owing to the loss of the support of the godet surface, and its elongation under the influence of the pulling force exerted by the wind-up means, in the axial direction. The summation of these effects provides a strand 27 of interconnected loops which comprises a mass of relatively long loops of a complex structure which surround a thin band of generally shorter length single loops lying along, or parallel to, the long axis of the strand, and the limbs of which merge into the limbs of the more complex outer loops.

The rotary movement of the godet inserts twist in the strand as it is withdrawn down the passage along the rotational axis of the body. The insertion of twist commences in the region where the sleeve departs from the godet surface and runs down the strand for a variable distance, often until a twist barrier is encountered. The ceramic guide ring 28 through which the strand 27 is passed constitutes such a twist barrier and it is observed that, in most instances, the twist is almost entirely imparted prior to the passage of the strand therethrough. The yarn 29 so obtained is wound up as a tapered end package on a conventional wind-up arrangement using a traverse mechanism (not shown). As illustrated, the yarn is laid on a bobbin 30 surface driven by roller 31 to form a yarn package 32.

The speed of the yarn take-up bobbin which effectively controls the rate at which the sleeve is pulled off the godet 22, is always much less than the rotational speed of the godet. Its speed is always maintained constant during a given operation and it is coordinated with the rotational speed of the godet, in accordance with requirements, for instance, twist level, for the yarn.

The godet around which the filament is wrapped as a sleeve, and which applies tension to the filament thereby continuously pulling it down onto itself at a speed which is faster than the extrusion speed, is usually profiled so as to slope downwards in the direction along which the sleeve is withdrawn, for then its orderly removal as a coherent, integrated structure is facilitated.

FIGURES 2–4 show perspective representations of actual godets that have been successfully used in this invention in the apparatus shown in FIGURE 1.

Each of the godets is a hollow lightweight construction with a continuous surface and is made of a high tensile strength aluminnium alloy.

The hollow shaft which is integral with the godet serves to attach it to a suitable drive, conveniently an electric motor, by means of which it is rotated.

The frusto-conical godet of FIGURE 2 has the following dimensions:

Maximum diameter _____ inches__ 3¾
Minimum diameter _____ do___ 1¼
Length along passage _____ do___ 3⅛
Angle of declination _____ degrees__ 19
Internal diameter of passage _____ inch__ ½

The bullet-nose godet of FIGURE 3 has the following dimensions:

Maximum diameter _____ inches__ 3
Minimum diameter _____ do___ 1⅛
Length along passage _____ do_____ 2
Angle of declination _____ degrees__ 30
Internal diameter of passage _____ inch__ ½

The slightly tapered essentially cylindrical godet of FIGURE 4 has the following dimensions:

Maximum diameter _____ inches__ 2⅞
Minimum diameter _____ do___ 2⅜
Length along axis _____ do___ 1½

Angle of declination _____ degrees__ 4
Internal diameter of passage _____ inch__ ½

The directional location of the godet relative to the spinneret is not critical and the process can be operated with the godet positioned on the same vertical line as the godet or off-set therefrom.

In terms of distance from the spinneret, the godet should be located beyond the point where the downwardly travelling filament has substantially completely solidified, otherwise the disruption of the filament into discontinuous staple length fibres may occur when the filament contacts the godet, and when more filaments than one are being pulled down onto the godet fusion between adjacent filaments may result because of inadequate quenching time. In the particular case of filaments derived from melt-spun polymers, for instance, synthetic organic polymers, such as polyamides, polyesters, polyhydrocarbons, polycarbonates and the like, the godet should be located beyond the region along the length of the extruded filament wherein the solidifying filament is in a highly transitional plastic state between the liquid and the solid states. Attenuation of the filament is effected predominantly in this region, for the stress imposed by the godet carries back along the filament and localises the attenuation in that region. In this transitional region the filament can be seen to accelerate and become taut, moving along its length at high speeds. The optimum location for the godet is determined by simple experiments which involve altering its position until it attenuates the filaments well but does not disrupt the filaments, or cause them to fuse together. In the case of polyhexamethylene adipamide, polyethylene terephthalate and polypropylene filaments the godet may be positioned anywhere between 18 inches and 10 feet beneath the spinneret face.

When operating with filaments derived from synthetic organic polymers, such as the polymer species listed hereinbefore, the peripheral speed of the godet should be sufficiently high to macromolecularly orient the filaments as well as to attenuate them.

The peripheral speed required to attenuate and orient the filaments to the desired extent, which speed is related to the design characteristics of the godet, its dimensions and speed of rotation, will vary according to the polymer being spun and process conditions, such as emergent viscosity of the polymer i.e. the melt viscosity at the time of extrusion, the rate of the extrusion and the linear distance between the spinneret face and the godet.

With respect to polyhexamethylene adipamide, polyethylene terephthalate and polypropylene filaments a reasonable degree of macromolecular orientation, as evinced by birefringence measurements and properties such as tenacity and extensibility, can be attained at peripheral speeds over 7,000 feet per minute. Peripheral speeds of below 7,000 feet per minute result in low tenacity filaments of limited utility. The tenacity of filaments can be improved by stretching the yarns containing them, but since this involves the addition of a further process step it is preferred to employ higher peripheral speeds and assemble drawn filaments into a yarn. Above 7,000 feet per minute, the peripheral speed can be increased until excessive filament breakage occurs. The maximum peripheral speed which can be utilised without excessive filament breakage is primarily set by the extrusion rate. When excessive filament breakage at the spinneret occurs at a particular peripheral speed, then this can be minimised and the peripheral speed rendered practicable by using higher extrusion rates.

The better development macromolecular orientation resulting from the higher peripheral speeds is associated with a decrease in the filament denier and consequently, a compromise has to be reached between orientation and filament denier. With polymers such as polyhexamethylene adipamide, polyethyleneterephthalate and polypropylene, peripheral speeds of 9,000–20,000 feet per minute result in filament deniers of between 1.2–6 depending primarily upon the extrusion rate. Since filaments having a denier of less than 1 are not of great utility, this denier reduction also imposes an upper limit on the peripheral speed of the godet.

High peripheral speeds for the godet, although essential for the most satisfactory operation of the process when melt-spun macromolecularly orientable synthetic organic polymers are used as the filament source, are also advantageously employed with other polymeric materials. This is so, because of the equivalency between the peripheral speed and spinning speed. Hence, high peripheral speeds are associated with enhanced productivity and the attainment of an economically favourable process.

Since the peripheral speed of the godet is determined by its dimensions, in particular its diameter in the region where the filament is led around the godet, and its rotational speed, a given peripheral speed can be attained either by rotating a relatively small godet at a comparatively high speed, or by rotating at a slower speed a larger body. Thus, considering the godet shown in FIGURE 4. At a rotational speed of 20,000 revolutions per minute, its peripheral speed at the skirt where its diameter is 2⅞ inches is approximately 15,000 feet per minute. An equivalent peripheral speed could be obtained by using a godet of a similar cylindrical shape, but having a diameter of 6 inches, by rotating it at 9,500 revolutions per minute. The use of a relatively large godet to attain a high peripheral speed is associated with certain difficulties. For instance, as the length of the axially-extending loops in the yarn is directly related to the length of the filament laid around, and along, the godet in a single traverse, the yarn which is derived from the sleeve withdrawn from a large godet (large length and/or large diameter) tends to contain long loops and this has a deleterious effect upon the structure of the yarn and the properties possessed by it. Furthermore, difficulties may be experienced in withdrawing the sleeve from the godet in an orderly and progressive manner. Additionally, a large body will have a lower bursting speed and it will occupy a greater amount of the limited space beneath a spinning station than a smaller body.

For these, and other reasons, it is preferred to obtain the desired high peripheral speeds by the rotation of a relatively small godet at a high speed. The use of high rotational speeds for the godet is also advantageous in a manner which will be explained more fully hereinafter, from the standpoint of the necessary insertion of twist in the strand of loops derived from the sleeve withdrawn from the godet.

By way of affording a more comprehensive appreciation of the expression "relatively small godet" there has been detailed herein the dimensions of the godets shown in FIGURES 2-4.

The rotation of these godets at 18,000 r.p.m. gives peripheral rotational speeds at the skirt of 15,290, 14,130 and 13,570 feet per minute respectively, and this is sufficient when melt-spun synthetic organic polymers are being processed to impart a useful degree of macromolecular orientation.

These godets are adequate for the collection, in the form of a sleeve, of up to 25 filaments having deniers of up to six, and the sleeve can readily be withdrawn therefrom in an orderly and progressively manner.

The upper limit on the godet dimensions compatible with the orderly and progressive removal of the sleeve, and the formation of the most satisfactory yarn, depends upon factors such as the godet profile, the rotational speed and the traverse speed, but with godets of a large diameter there is an increasing propensity for "snatching" of the sleeve during its withdrawal; "snatching" results in the formation of a slub yarn of an irregular denier and consequently of limited utility and also the frequent breaking of filaments with the interruption of the process.

As previously mentioned, the downwardly travelling filament is led through a traverse mechanism which imparts a reciprocating motion to the filament so as to spread it out over the surface of the godet in the form of a sleeve comprising a series of interconnected and superimposed helices. The traverse mechanism is located a short distance above the godet. If it is positioned too far away from the godet then there is some loss in the effectiveness of the traverse device in spreading the filament over the surface thereof, while, if it is too close to the godet, then difficulties may be encountered in stringing-up the apparatus. The optimum location for the traverse mechanism is determined by shifting it away from the godet until stringing-up of the apparatus can be effected without difficulty. When operating with traverse mechanisms of the type wherein the filament is passed through a thread guide contained in a traverse bar which is reciprocated by mechanical, hydraulic, electromagnetic or other similar means, and using the godet shown in FIGURES 2-4, this optimum distance is between 1 and 6 inches above the godet, and most commonly 1.5 to 4 inches above it.

For the most satisfactory operation of the process of this invention it is desirable that the traverse mechanism should have a traverse speed which is high relative to the traverse speeds ordinarily employed in the winding of continuous filaments into packages in a continuous filament spinning machine. One traverse device which can move the filament back and forth along the godet at high speed, and that is suitable for use in the apparatus of FIGURE 1, is shown in plan view in FIGURE 5.

Referring to that figure, the traverse mechanism comprises a thin metal traverse bar 33, one end 34 of which is clamped to an end of a U-shaped iron block 35 and the other end 36 carries a light two-pronged filament guide 37 constructed of two ⅟₁₆-inch diameter and ½-inch long ceramic pins. The iron block 35 serves as the core of an electromagnet, indicated generally by reference numeral 38, and the nexus 39 thereof is surrounded by a wire wound into a coil 40 which is connected through a variable transformer to a source (neither of which are shown) delivering 50 cycles of alternating current per second. A silicon diode rectifier 41 is connected in series with the coil of the electromagnet so as to pass only alternate half cycles of current. The flux induced in the iron core 35 imparts a reciprocating motion to the cantilever traverse bar 33 which is tuned to move back and forward at the desired speed of 50 cycles per second by adjustment of its free length. The traverse is sinusoidal in character with an amplitude (peak-peak) of approximately 1.5 inches.

FIGURE 6 shows an alternative high speed traverse mechanism, which is mechanical rather than electrical in operation, and that may be used in the apparatus of FIGURE 1.

In its essential form, this traverse mechanism comprises an arrangement for converting the rotary motion of a crank into rectilinear movement, the latter operating on a traverse bar via a connecting rod, and it utilises a Scotch yoke to eliminate the irregularity of motion, common to all ordinary crank devices. Referring to the figure, the filament being passed to the godet is carried through a ceramic thread guide 42 attached to one end of a light tubular steel traverse bar 43 which is pivotally connected at its other end to a bracket 44. The traverse bar is also secured to a connecting rod 45 by a pin 46 which can move in a longitudinal slot 47 in the traverse bar. It will be apparent from an inspection of the figure, that if the connecting rod is reciprocated, a like motion will be imparted to the traverse bar. To secure the reciprocating action, the connecting rod is rigidly secured to a cross-head 48, which contains a slot 49 within which there is located a slidable block 50. The block is connected through a crank pin 51 to a crank 52 attached to one end of an axle 53 which is rotated at a uniform speed by an electric motor controlled by a variac transformer (neither of which are shown).

Thus, by means of the rotating crank, a continuous reciprocating motion is transmitted through the connecting rod to the traverse bar which in moving back and forth describes an arc. On account of its simplicity, this traverse mechanism is reliable in operation and is capable of attaining traverse speeds of up to about 100 cycles per second. The traverse is essentially sinusoidal in character, and its speed can readily be altered and the amplitude adjusted, the latter in accordance with the length of the godet along which the filament is to be wrapped.

In operation, the traverse bar in the mechanisms shown in FIGURES 5 and 6, is positioned in a horizontal plane essentially at right angles to the long axis of the godet so that the filament passing through the thread guide is traversed back and forth along the length of the godet.

Traverse mechanism other than the two shown may be employed, and it is not necessary that the reciprocating movement be imparted to the filament by its passage through a thread guide contained in a displaceable traverse bar. For instance, the traverse mechanism may be pnuematic in operation with the filament passing through a zone wherein it is subjected to a transverse stream of air the direction of which is rapidly and continuously alternated.

A similar effect may be obtained electrostatically by passing the filament between two plates the polarity of which is rapidly and continuously reversed.

Due to the axial movement imparted to the filament by the traverse mechanism, and also the rotary movement of the godet, the filament is wrapped around the godet in a series of interconnected and superimposed helices which form an approximately tubular sleeve around the godet.

FIGURE 7 is a diagrammatic representation of the configuration adopted by a filament wrapped around the godet in one complete traverse cycle. Initially, the filament advances along the godet in one direction as a right-hand helix 54. At the point X, which corresponds to the extreme right hand end of the traverse cycle, there is a reversal of the direction in which the filament moves along the godet, and a second helix 55, in this instance a left-hand helix, which overlies the first helix, is formed. Both helices contain the same number of turns and are of the same length which approximately corresponds to the traverse amplitude. The structure derived from a single complete traverse comprises the two interconnected and superimposed helices, 54 and 55, of opposite hand, although they were generated in the same rotational direction. This double helical structure constitutes one layer of the sleeve which is built up on the godet and for convenience in this specification the term "layer" will be used in reference to the double helical structure formed from one complete traverse.

A layer, when projected onto a plane surface, as in the developed plan shown in FIGURE 8, describes a series of linked curves, the configuration of which is similar to certain kinds of lissajou figures known in mathematics. The configuration of the filament within a layer is reflected in the structure of the axially-extending loops in the yarn as will be explained in more detail hereinafter.

The characteristic structure of the yarn of this invention and the properties manifest by it, are dependent upon the formation on the godet of a transient assembly in the form of a sleeve constructed of a plurality of layers each derived from a single traverse, the orderly and progressive withdrawal of the sleeve from the godet, and its eversion in a controlled manner.

When the advantageous high peripheral speeds are employed for the godet, the formation of such a sleeve, assuming that there is the usual slow withdrawal speed, is dependent upon a high speed of traverse in the traverse mechanism.

Moreover, the helical angle of the turns within a layer is determined by the peripheral speed of the godet, the godet profile and the traverse speed at which the traverse mechanism operates, and a high traverse speed is reflected in a relatively large helical angle. When using the traverse mechanism of FIGURE 6 with a traverse speed of 80 cycles per second and the godet of FIGURE 4 with a peripheral speed of 15,000 feet per minute, the filaments at the mid-point of the traverse cross at an angle of around 18°.

A high value for the helical angle enhances the frictional interaction between successive layers and between the two helices of the same layer and aligns the turns of the helix into positions more suitable for withdrawal.

The minimum traverse speed compatible with the formation of a satisfactory yarn, and the smooth operation of the process depends on the design characteristic of the godet, its dimensions, its peripheral speed, the speed at which the sleeve is withdrawn from the godet and like variable factors. With respect to the traverse mechanism of FIGURES 5 and 6 when used with the godets shown in FIGURES 2–4 and other godets of similar dimensions operating at peripheral speeds of between 7,000 and 20,000 feet per minute, and with the sleeve being withdrawn at a rate of up to 500 feet per minute, the traverse speed can be varied over a wide range above 600 cycles per minute, preferably above 1,000 cycles per minute. Traverse speeds below 600 cycles per minute are associated with frequent breakdowns in the process and result in a slubbed yarn of irregular denier and consequently of limited utility. With peripheral speeds of less than 7,000 feet per minute, the traverse speed can be correspondingly less than 600 cycles per minute and still produce a reasonably uniform yarn of good properties.

To obtain the desired yarn from the approximately tubular sleeve which forms around the godet, it is necessary as a first step, progressively to remove layers from within the sleeve and thereafter to turn the layer inside-out in a controlled manner. This is accomplished by pulling, using the wind-up device, the narrow end of the sleeve down the inclined surface of the godet and then along the passage therein. Layers within the sleeve are generally moved away in the order in which they were assembled around the godet. However, because of the good frictional interaction and coherency between adjacent layers, attributable to the high traverse speeds employed, a tractive effect is exerted by a given layer, as it moves, on successive layers so that the entire sleeve advances down the inclined surface of the godet, and moves along the passage, as an integrated structure. During the reversal of the direction of forward movement occasioned by this sequence of operations, the layers are everted, and because the sleeve moves as an integrated structure, this evertion is effected in a controlled manner. The sleeve is essentially a transient assembly for, although it is continuously propogated by the deposition of additional layers around its outer surface, it is continuously and simultaneously diminished by the withdrawal of layers from the interior thereof. Once the withdrawal of layers has been commenced, and provided a constant wind-up speed is maintained, an equilibrium state is attained between the accumulation of layers within the sleeve and their withdrawal as a strand of loops. The sleeve present on the godet after the commencement of the withdrawal of layers comprises a plurality of layers arranged in a superimposed array, but with successive layers disposed in a staggered relationship to one another.

Figure 9:
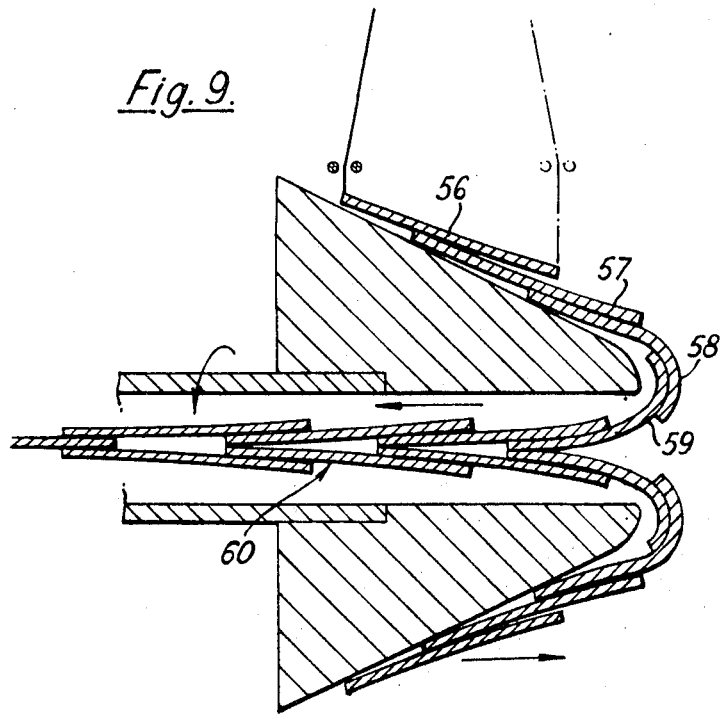
FIGURES 9–10 are diagrammatic and essentially idealised views illustrating the structure of the sleeve which is built up around the rotatable body and the relationship between various layers therein both on the body and as the sleeve moves off it and is everted by being pulled through an axially-extending passage in the body.
Figure 10:
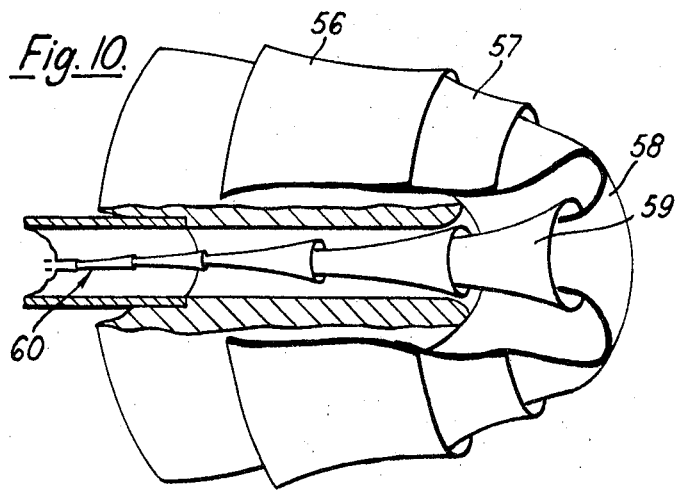

FIGURES 9 and 10 show in a diagrammatic and idealised manner, the relationship between successive linked layers on the godet and they illustrate phenomena which occur during the removal of the sleeve from the godet, its evertion and its collapse into a strand of loops as it moves down the passage.

In the diagrammatic cross-sectional view of FIGURE 9, a newly deposited layer 56 overlaps the layer 57 deposited immediately previously but which, in the interval of the time after its formation, has moved down the inclined surface of the godet under the tractive effect exerted by layer 58 which has partially moved off the godet surface. The forward end of the layer 57 is being pulled round into position for moving down the passage, under the tractive effect exerted by the layer 59 which has moved completely away from the godet surface and, because of the reversal of the direction of forward movement, which occurs more or less simultaneously with its movement off the surface, has been turned inside-out. The relatively short length loops, none of which are shown, but which are always present in any layer, and which project outwardly therefrom when it is on the godet surface, are transferred, owing to the evertion, to the interior of the strand of loops.

In the cross-sectional view shown in FIGURE 9 the sleeve, of which only three layers are shown on the godet, is a tegulated structure with the interconnected layers arranged on top of one another, but with a staggered relationship between layers. As each layer comprises two interconnected and overlaid helices which are generated around the godet serving as a framework, the actual structure of the sleeve more closely resembles that shown in the side view of FIGURE 10, with each layer contained for a variable part of its length within the layer assembled immediately after it, and to which it is linked.

Thus, layer 57 is contained for part of its length within layer 56, the two layers being linked through the continuation of a component helix of layer 57, as one of the helices, of opposite hand, in the layer 56. In a similar manner layer 59 is contained for part of its length within the layer 58. An arrangement such as that shown in FIGURES 9 and 10, makes for good frictional interaction between the overlaid layers and this assists the removal of the sleeve as an integrated structure with a retention of staggered relationships between successive layers, and its evertion in a controlled manner.

The loss of the support afforded by the godet as a layer moves off its surface, results in a collapse of the serially connected helices of which it is composed. Simultaneously with their collapse, the helices within a layer are extended in an axial direction under the impetus imparted by the pulling action of the wind-up device. The summation of this axial elongation and collapse of the helices results in the formation of a structure comprising 2 limbs, each derived from a component helix of the layer, which are interlaced and thereby stabilised, owing to the limbs crossing one another at a variable number of points along their length.

Structure of this general type will be referred to in this description as complex loops to distinguish them from the generally shorter length loops, usually of a less complex character, which on the evertion of the sleeve are transferred from the periphery to the interior of the sleeve.

Figure 11:
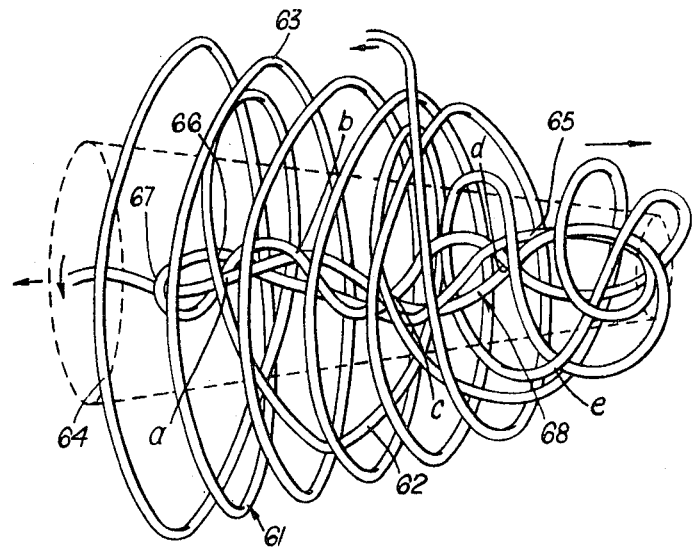
FIGURE 11 is a diagrammatic view illustrating in more detail, and in an idealised manner, the relationship between two layers of the sleeve in the region where the sleeve is moving off the rotatable body and is being everted.
Figure 12:
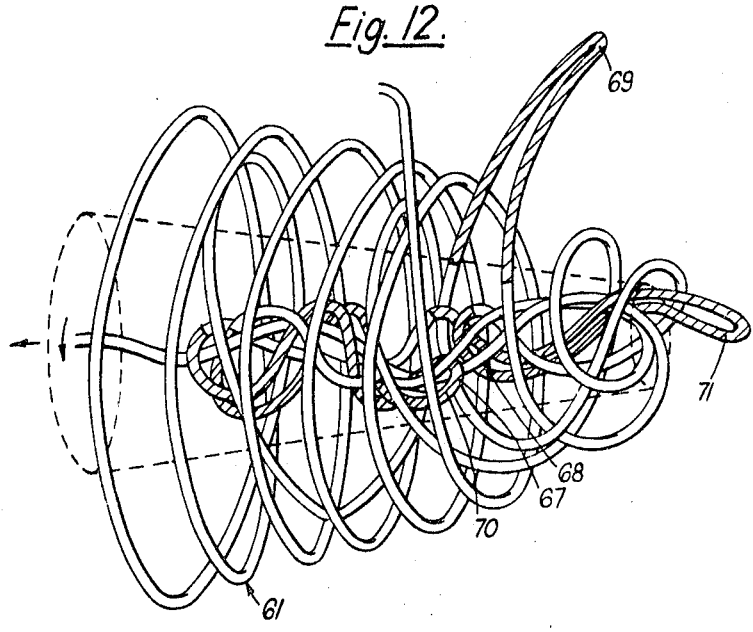
FIGURE 12 is a diagrammatic view similar to that shown in FIGURE 11 but illustrating how the layers comprising the sleeve are modified under the operating conditions and the effect of the eversion on the layers as they are withdrawn. The view shown more closely approximates to the structure which is actually present in the sleeve.

FIGURES 11 and 12 illustrate the structure of the layers assembled around the godet, the relationship between two layers, the evertion of one of them as it moves off the godet down the passage and its collapse and simultaneous elongation into a loop which constitutes an axially-extending loop in the resulting yarn.

Referring to FIGURE 11, a newly deposited layer 61 comprises two helices 62 and 63, spread out over the length of the godet with the left hand helix 63 overlying the right-hand helix 62 and the helices serially connected at the extreme left-hand end of the godet through the common chord 64 which constitutes the trailing end of layer 61.

Each of the helices contains five turns and two turns 65 and 66 at the forward end of the first laid helix 62 have moved off the godet under the influence of the tractive effect exerted by the layer 68 deposited on the godet immediately previously to the layer 61.

The layer 61 is connected at its leading end 67 to the layer 68. The layer 68 which likewise comprises two serially connected, five turn helices, has, except for the trailing end, entirely moved off the godet surface and into the passage within the godet. In moving off the surface of the godet and down the passage the layer 68 is turned inside-out and because it loses the support of the godet surface it collapses in the vertical direction. Simultaneously with its collapse the layer is elongated in the longitudinal direction thereby forming a long loop with interlaced limbs owing to the intercrossing of the limbs which occurs at the five nodal points (a–e) and which correspond to the points in the initial layer, where one helix crossed over the other.

FIGURE 11 is very much an idealised representation of the sleeve, and is intended only to illustrate the relationship between successive layers and the phenomena which occur during their withdrawal. FIGURE 12 more accurately illustrates the configuration of layers on the surface of the godet and the influence of the evertion on the structure of the strand of loops formed from the withdrawn layers. Referring to that figure, the trailing end of the layer 68 projects outwardly from the godet surface, as a relatively short length loop 69. This shorter length loop is derived from the action of the centrifugal force, arising from the rotation of the godet, on a loosely-wrapped individual turn of a helix in the layer 68. On the evertion of the layer this loop 69 will be transferred to the interior, and will occupy an approximately central position in the strand of loops, aligned essentially parallel to the long axis thereof. Two such aligned loops, which at an earlier stage projected outwardly from the godet surface, are indicated by reference numeral 70, this loop incorporating the leading end 67 of the layer 61, and reference numeral 71, this loop being driven from a turn of the outer helix of the layer 68.

Although FIGURE 12 is believed to approximate more closely than FIGURE 11, to the actual structure of the sleeve and the events which occur during its withdrawal, it, like the others, FIGURES 9–11, is somewhat idealistic for, in actual operation, the sleeve built up around the godet normally contains many more layers, and because of their number, the fineness of the filaments, and the speeds involved, it is impossible to determine with complete accuracy, or to record, the structure of the sleeve, and the complex series of events which occur.

However, high speed photographs and experiments with model systems, although highlighting the complexity, verify the essential validity of the analysis of the sleeve structure and the explanation of the phenomena occurring during its withdrawal and evertion which is provided hereinbefore. In particular, these techniques confirm that a plurality of layers accumulate on the godet so as to form a sleeve, that there is a progressive and generally orderly advancement of the sleeve down and off the godet with the layers moving approximately in the order in which they were deposited but with the whole assembly moving as an integrated and coherent structure. The high speed photographs and the experiments with model systems also confirm that in the evertion, which occurs more or less simultaneously with the departure of the layers from the godet surface, the outwardly projecting loops are conveyed into the interior of the structure and that the helices forming the layers collapse, and are elongated axially into long loops of complex structure.

The removal of the sleeve in an orderly and progressive manner implies that the layers are arranged therein in a superimposed but staggered relationship, and it is the retention of this arrangement during, and subsequent to, the withdrawal and evertion which endows the yarn with its characteristic structure and some of its advantageous properties.

Owing to the rapidity of events, a number of layers move off the godet surface practically instantaneously, although overall the staggered relationship is maintained, so that a strand of more or less axially-extending interconnected loops is formed with many of the loops being contained for a variable part of their length within another loop.

FIGURE 13 shows a diagrammatic view, at a greatly enlarged scale, of a small section of a strand of loops derived from a sleeve containing layers similar to the two layers shown with reference to FIGURE 12.

The structure shown comprises a layer formed of a nest of essentially axially-extending interconnected complex loops which surround a central band composed of loops which are aligned parallel to the long axis of the structure and the limbs of which merge with either or both of the limbs of the complex loops.

One loop 72, has its closed end 73 at the extreme left-hand end of the section and extends along it to terminate in its leading end 74. One limb 75 of the loop, because it derives from an underlying helix in the initial layer, extends slightly further forward than the other limb 76 of the loop. The two limbs of this complex loop are interlaced owing to the crossing of limbs which occurs at the five nodal points (a–e). This interlacing, interlocks the limbs and so stabilises the complex loops, and is attributed to the formation of the loop from a layer which comprises two serially connected overlaid helices of opposite hand. The number of nodal points present corresponds to the number of turns within each helix of the layer.

The retention during, and subsequent to, the withdrawal and eversion of the superimposed but staggered relationship between layers of the sleeve is reflected in the structure of the strand of loops. Thus, the loop 72 is contained within another axially-extending complex loop 79 derived from the next succeeding layer within the sleeve and the two loops are interconnected at the leading end 80 of the loop 72. The limbs of the loop 79 are interlaced in a similar manner to those for the loop 68. Moreover, loop 72 itself envelops another complex loop 81, the closed end of which lies approximately midway along loop 72. This loop also contains within it another complex loop 82, part only of which is shown. The general arrangement of this outer layer is that of a nest of axially-extending interconnected loops which have a complex structure.

Within this nest of loops there is located two loops 77 and 83 which are disposed along the axis of the strand in a generally central position. Initially, that is when the layers were on the godet, these loops projected outwardly from the main mass but on account of the eversion they have been conveyed to the interior and thereby embedded within the strand. Loop 77, the closed end 78 of which extends up to the closed end 73 of the complex loop 72, is derived from the middle turn of the outer helix of the layer in which the loop 72 originated. The limbs of the loop 77 run into at two places the limb 74 of the complex loop. Loop 83, a length of which, toward its closed end 84, is contained within the loop 77, is derived from the portion of a layer which constitutes the common chord between its component helices and consequently, the limbs of the loop run into different limbs of the complex loop 82. Both of the loops are shown containing the twist which is inserted therein, as well as in the complex loops, although for clarity the twist present in these loops has been omitted, when the layers leave the godet surface.

FIGURE 14 is a diagrammatic view at a greatly enlarged scale of the strand of loops shown in FIGURE 13 when the strand has moved further down the passage and has been consolidated by the insertion of the required amount of twist into a stable yarn. This figure, in which component elements are identified by the reference numerals used to indicate them in the previous figure, affords some indication of the complexity of the structure and the relationship between the various elements.

Loops within the strand are rarely so uniformly arranged as the diagrammatic and idealised illustration of FIGURES 13 and 14 would suggest for the loops are always displaced and entangled to a variable extent. In particular, subsequently to the consolidation of the strand owing to the insertion of twist, it is seldom possible, because of the complexity of the structure, to distinguish between the two types of loop, which interact with one another to form a relatively compact axially-extending array of loops. Despite its relative compactness, the array of loops is bulky because of its complex structure in which there are numerous voids between limbs of the many loops.

Despite the complexities of the structure the configurations adopted by the loops as shown in FIGURES 13 and 14 occur with sufficient constancy to provide cross-sections taken at random intervals along the length with approximately the same number of filaments.

The number of filaments in the cross-section corresponds to the ratio between the peripheral speed of the godet and the linear speed at which the sleeve is withdrawn therefrom, multiplied by the number of filaments passed to the godet. For example, if the peripheral speed of the godet is 10,000 f.p.m. and the sleeve is withdrawn therefrom at a linear speed of 250 f.p.m., there will be, assuming one filament was passed to the godet, 10,000/250 or approximately 40 filaments at any point along the strand.

A number of loops of the strand may not be confined to the distinct array formed by the interconnected axially-extending loops but may escape therefrom for part of their length. The content of such loops is always less than in a strand derived from a sleeve which is pulled off the godet along its axis of rotation and is not everted.

As the sleeve moves off the godet and down the passage, twist is inserted therein and this twist condenses the strand of loops formed from the sleeve into a bulky yarn.

The twist insertion is a result of the rotation of the godet relative to the linear movement of the strand of loops and it arises because at some stage in their withdrawal from the godet, the layers within the sleeve are located partly on the godet and partly in the strand of loops which has moved away therefrom under the impetus imposed by the wind-up device. With one end restrained in the strand which is itself held by the wind-up device, the other end is rotated by the godet and consequently twist is inserted in the strand. The twist inserted runs down the strand until it encounters a twist barrier.

Figure 15:
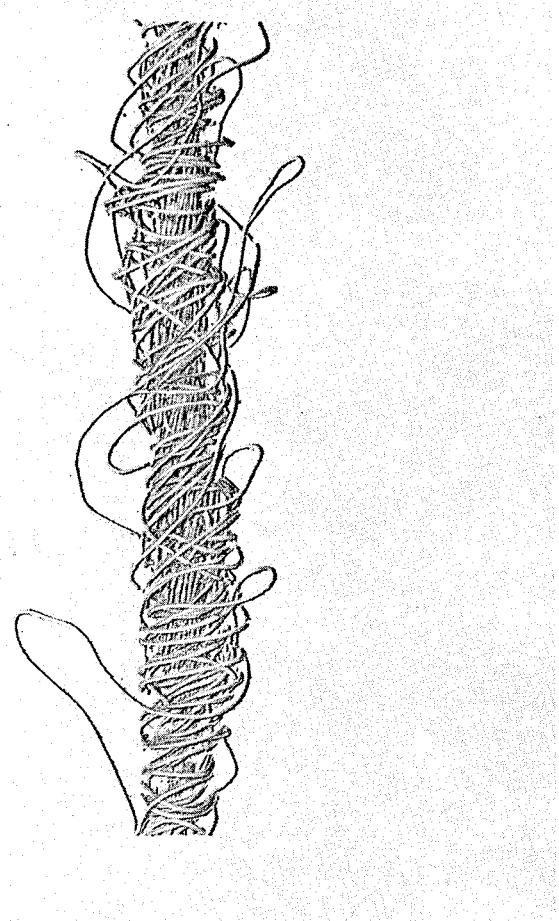
FIGURE 15 is a photograph of a model of a length of yarn made in accordance with this invention as it was observed under an ordinary microscope.

FIGURE 15, as previously indicated, is a photograph of a model which actually reproduces the structure of a short length of yarn made in accordance with this invention as it was observed under a microscope.

The yarn comprises a relatively compact core 91 around which a number of relatively short length loops 92 are wrapped for a variable number of helical turns, thereby forming a thin discontinuous sheath 93. The yarn contains only a few radially-projecting loops.

The core 91 comprises a concatenation of interconnected loops, aligned essentially parallel to the long axis of the yarn, but with the loops twisted together in more or less regular helices with a helical angle of around 70°.

Cross-sections taken at random along the lengths of the yarn show an approximately constant number of filaments in the core. The number of filaments found is related to the linear speed (E) at which the filaments meet the godet, their number (N) and the linear speed (W) at which the loops are withdrawn from the godet. The number can be found by multiplying the ratio $E/W \times N$. The cross-sections frequently show in addition to the parallel filaments which represent the limbs of the loop, the curved end of one or more loops.

Many loops within the core, owing to the progressive and orderly manner in which the sleeve is moved off the godet, are arranged so that they are contained for at least part of their length within another loop thereby forming a nest of loops with a general advancement of loops along the yarn. Loops within the nest are stabilised by the interlacing of component limbs. In addition to this nest of loops there is also present a number of loops which are located more or less in the centre of the core and aligned essentially parallel to the long axis thereof. These centrally disposed loops are derived from loops which, when the sleeve was present on the godet, projected outwardly therefrom. It should be understood that, owing to the complexity of the core structure, it is seldom possible to distinguish between the two kinds of loops of which it is composed, although their presence may be inferred by observation at the stage of yarn formation. Furthermore the axial arrangement of the loops within the core is more complex than the above description thereof, and, in particular, there is considerable entanglement between adjacent loops which may distort the nest of interconnected loops, although overall the nest arrangement is retained. The overall general picture is that of an array of interconnected loops, each containing a segment aligned in a direction essentially parallel to the long axis, although helically twisted in that direction.

The loops 92 which are wrapped around the core to form a discontinuous sheath 93 are believed to be derived from outwardly projecting loops on the initial sleeve which were not transferred from the periphery to the interior during the evertion of the sleeve.

The yarn shown in FIGURE 15 has a structure which is representative of many yarns made in accordance with this invention. However, although some loops always emerge from the core and are wrapped around it, they need not be so numerous as in the structure shown in FIGURE 15 and the sheath may be so discontinuous as to lose much of its appearance as a sheath.

Figure 16:
FIGURE 16 is a photograph of a model of a length of yarn made in accordance with the process described and claimed in the specification of the aforementioned application as it was observed under an ordinary microscope and is included for comparative purposes.

FIGURE 16 which is included for the purposes of comparison, is a photograph of a length of yarn made in accordance with the process described and claimed in the aforementioned application wherein the sleeve assembled around the godet is withdrawn therefrom along the axis of rotation and is not everted. The yarn comprises a relatively compact core and an extensive peripheral region containing a multiplicity of radially-projecting loops. These radially-projecting loops convey to the yarn a distinct hairy or fuzzy appearance. In yarns of the present invention most of these radially-projecting loops, because of the evertion of the sleeve, are embedded in the interior of the yarn. The reduced content of radially-projecting loops in the yarns of this invention is reflected in the high value for the air drag factor, which is always at least 7.5. This high value arises from the reduced damping of a pendulum containing the yarn and hence the relatively high value determined for the number of swings occurring between an amplitude of 30 and 20°. The reduction in the content of these loops conveys to the yarn a more regular and uniform appearance, makes the processing of it, for instance, on weaving or knitting machines less troublesome because of the lower incidence of "snatching" in machine parts, and fabrics made therefrom have a reduced tendency to pill.

A characteristic feature of the yarn represented in FIGURE 15 as with all the yarns of this invention, is its bulkiness, i.e. relative volume occupied by a given weight. The bulkiness is a reflection not only of the readily visible loops arranged as a wrapping around the core or projecting outwardly therefrom, but also the structure of the core wherein loops which are of a complex structure and which are comparable to the staple fibres in a spun staple yarn nest one within another with some integrated entanglement between them. Because of their bulky nature, the yarns have an excellent covering power and fabrics made from them have good warmth. The surface of the yarns although more regular than the yarn shown in FIGURE 16, is still irregular and this irregularity gives them a handle or feel similar to that of spun yarn made of comparable staple length fibres.

As the twist inserted in the strand of loops is a function of the rotary movement of the godet relative to the linear speed at which the bundle is moved away by the wind-up device, it is determined by the operating conditions at which the apparatus is employed. Thus, for example, if the filaments are passed to the godet at a speed of 10,000 feet per minute, and the sleeve formed thereon is then caused to rotate at 15,000 r.p.m. through rotation of the godet at this speed, before being pulled from it and wound-up at a speed of 250 feet per minute, the twist insertion rate is $$\frac{15{,}000}{250\times 12}\text{t.p.i.}$$

or 5 turns per inch.

Hence the amount of twist which is inserted, and which imparts to the yarn the necessary coherency and stability, can be controlled in a simple and effective manner. The optimum twist for best properties in the yarn is dependent upon the denier thereof and the relationship between these two parameters is concisely expressed by means of the twist factor.

The most satisfactory yarns of this invention have a twist factor in the range between ¾ and 10 and most usually between 1 and 4. The direction of the twist which is inserted depends upon the direction in which the godet is rotated.

At very low twist levels the yarn may be drafted down to lower deniers by conventional means.

The apparatus described with reference to FIGURE 1 is, from a technical standpoint, a false twist apparatus, since neither the spinneret nor the package on which the yarn is wound up rotate about the yarn axis, yet the yarn which is wound must be considered as possessing real twist. Certainly, it is virtually impossible to remove any appreciable amount of twist from the yarn by the application of tension thereto and the yarn is a stable product which can be wound up in a conventional package and stored indefinitely.

The invention will now be illustrated by the following specific examples which are not to be construed as limiting the scope thereof.

In these examples, the expression "corresponding yarn" refers to a yarn made by a process similar to the process of this invention but without the evertion of the sleeve.

Example 1

Polyhexamethylene adipamide having a relative viscosity of 35 was extruded through 0.009 inch diameter orifices in the spinneret 13, at a spinning temperature measured at the spinneret of 273° C. and at a rate of 0.05 lb. per hour per orifice.

One of those filaments was passed through the filament guide in the sinusoidal traverse mechanism shown in FIGURE 5 which operated at a frequency of 50 cycles per second and had an amplitude of 1.5 inches and then wound around the frusto-conical shaped godet having the same dimensions as the godet shown in FIGURE 2. The godet, which was driven by an electric motor at a speed of 18,000 r.p.m. which gave a peripheral speed of 9,200 f.p.m., was located 26 inches below the spinneret face and 2 inches below the traverse mechanism. The filament was wrapped around the godet in the form of a succession of layers each of which, in this particular example, had the form illustrated in FIGURE 7, namely two serially connected helices, laid in opposite directions over a length of 1½ inches of the godet surface with one overlapping the other. Each helix contained 3 turns of the filament so that 6 turns were laid for a complete traverse. The diameter of the resulting tapered tubular sleeve 15 was 2.5 inches at its widest part and 1.9 inches at its narrowest.

Although the peripheral speed of the godet varied as the filament traversed the one and a half inches along its length in the direction from the skirt to the nose, we found that the denier and birefringence of the filament so traversed was substantially constant at all points along the laid length.

The lack of cyclic variations in denier and birefringence of the filaments wound onto the godet is probably explained on the basis that the fluctuations from maximum to minimum peripheral speed along the godet take place so rapidly that they are evened out by the inherent elasticity of the supply filament and do not affect the attenuation and orientation which are predominantly localized in the region where the filament is in a highly transitional plastic state. The birefringence measurements showed that the filament wound on the godet was reasonably well oriented.

A constant speed wind-up device continuously moved the sleeve off the godet surface and pulled it along the ½ inch diameter axially-extending passage contained within the godet. More or less simultaneously with its withdrawal, the sleeve, owing to the reversal of the direction of forward movement, was everted, while, on losing the support of the godet, it collapsed. The resulting strand of loops was twisted into a yarn, in which form it was wound up at a rate of 130 feet per minute.

The sleeve was pulled off the godet and down the passage without the assistance of mechanical means other than the wind-up.

The yarn which possessed 11.5 t.p.i. had the following properties:

Denier _____ 206
Breaking strength _____grams__ 300
Extensibility _____percent__ 30
Air drag factor _____ 12

Individual filaments in the yarn were present as loops which had a variable length up to 18 inches and had a birefringence of 0.036 and a denier of 1.4.

The importance of the step of turning the sleeve inside-out and its influence on the resulting yarn was reflected in the attractive, regular and lean appearance and soft lean handle possessed by the yarn. These properties were better developed in this yarn than yarn produced in the absence of a turning inside-out step.

The yarn which had the appearance of a twisted cotton yarn possessed good covering power, could be readily dyed and fabrics made therefrom had a soft and pleasant handle and did not yellow to any appreciable extent when heat set. Furthermore it had excellent bulk and loft characteristics.

Example 2

Polyhexamethylene adipamide having an inherent viscosity of 0.882 (measured in 90 percent phenol/water at 25° C. and a concentration of 0.5 percent) and containing 0.03 percent titanium dioxide was extruded through 0.009 inch diameter orifices in a spinneret at a rate of 0.05 lbs. per hour per orifice at a spinning temperature measured at the spinneret of 273° C. into ambient air at 20° C.

One of the polyhexamethylene adipamide filaments was passed along a generally defined downward path to a godet positioned slightly off-set from the spinneret and at a distance of 38 inches from its face. The godet was profiled so as to resemble the bullet-nose godet shown in FIGURE 3 and it had the following dimensions.

Maximum diameter (skirt) _____inches__ 3½
Maximum diameter (nose) _____do____ ¾
Axial length _____do____ 2½
Angle of declination _____deg__ 40
Diameter of axially-extending passage _____inch__ ½

The godet was attached through its hollow shaft to an electric motor by means of which it was driven at 18,000 r.p.m. when its peripheral speed was 9,400 f.p.m. Before passing onto the godet the filament was lead through the thread guide in the traverse bar of the traverse mechanism shown in FIGURE 6 with the traverse bar lying in a horizontal plane normal to a vertical plane through the longitudinal axis of the godet. The traverse mechanism was located 2 inches above the surface of the godet and operated at a traverse frequency of 2,000 cycles per minute and an amplitude of 1.5 inches.

Stringing up of the process was effected in the following manner:

The filament after extrusion from the spinneret, and after it had substantially completely solidified, was introduced into an aspirator jet of conventional design and the impetus which it imparted to the filament applied tension to it. The jet was then moved down to a position below the godet rotating at its operating speed and the filament carried down by the jet was lead through the thread guide in the traverse bar which was at rest.

The filament was then wrapped manually around the godet surface which caused the filament to break above the aspirator jet, and the traverse mechanism was simultaneously set in motion. Thereafter, the godet pulled the filament down upon itself and because of the action of the traverse mechanism an approximately tubular shaped sleeve was propagated around the godet. The circumference of the sleeve at its narrow end was pulled away through the axially-extending passage. The withdrawal of the sleeve in this manner could be achieved by pushing a wire into, and through, the passage, allowing the sleeve to condense around it, moving the wire from the strand of loops, and leading the strand to a wind-up device. The wind-up device which operated at 80 f.p.m. imparted a substantially constant tension to the sleeve and consequently an equilibrium was soon attained between the formation of the sleeve on the godet and its withdrawal in the form of a strand of loops. No mechanical means other than the wind-up device was required to withdraw the sleeve from the godet. Twist was inserted in the strand of loops to condense it into a yarn and to impart to the yarn a necessary coherency and stability. The yarn was then wound into a package on a bobbin.

Some of the properties of the yarn which were determined are listed below:

Denier _____ 167
Twist (t.p.i.) _____ 18.75
Twist factor _____ 3.3
Tenacity (gms./denier) _____ 1.68
Extensibilities (percent) _____ 70.9
Air drag factor _____ 10.1
Bulk factor (percent) _____ 3.2
Packing density (gm./cc.) _____ 0.88

Individual filaments in the yarn had a mean denier of 1.5 and a birefringence of 0.038.

The yarn, a photomicrograph of a length of which is shown in FIGURE 17, resembled in appearance and feel a yarn spun from polyhexamethylene adipamide staple fibres and its bulk as expressed by the bulk factor was greater. The photomicrograph shows that the yarn contains a number of radially-projecting loops but the content of such loops is much greater in the corresponding yarn. This could be ascertained visually and tactually, and by measurement of the air drag. The air drag of the corresponding yarn was much greater than that of the yarn of Example 6 and the air drag factor was 1.63.

Examples 3–6

Employing the apparatus assembly of Example 2 operating at the same speeds, yarns were made from several filaments, derived from the same polyhexamethylene adipamide used in that example. The number of filaments passed to the godet in each case and some of the properties of the yarns which were obtained are reported in Table 1 which follows:

TABLE I

| Example | No. of filaments | Denier | Cotton count | Twist (t.p.i.) | Twist factor | Tenacity, gms./den. | Extensibility, percent | Air drag factor | Bulk factor, percent | Packing density, gm./cc. | Denier | Birefringence |
|---|---|---|---|---|---|---|---|---|---|---|---|---|
| 3 | 2 | 310 | 17.2 | 18.75 | 4.5 | 1.63 | 67.7 | 15.7 | 3.5 | 0.71 | 1.1 | 0.042 |
| 4 | 4 | 640 | 8.4 | 18.75 | 6.5 | 1.32 | 67.6 | 67 | 1.4 | 0.91 | 1.3 | 0.039 |
| 5 | 6 | 895 | 5.55 | 18.75 | 7.9 | 0.94 | 66.4 | 45.4 | 1.8 | 0.85 | 1.4 | 0.036 |
| 6 | 8 | 1,185 | 4.4 | 18.75 | 8.9 | 0.81 | 67.9 | 34.0 | 2.6 | 0.63 | 1.4 | 0.037 |

Notes on Table 1

*Example 3.*—The yarn had the handle and feel of a spun yarn made from polyhexamethylene adipamide staple fibres, and it could be woven into a fabric possessing a good warmth. The air drag factor of the corresponding yarn was 1.21.

*Example 4.*—A photomicrograph of a length of the yarn is shown in FIGURE 18. Under the microscope the yarn was seen to consist of a relatively compact core and a discontinuous sheath formed of many generally shorter length loops wrapped around the core. There was also present a number of radially-projecting loops, some of which can be seen in the photomicrograph, but the content of such loops was much less than in the corresponding yarn. Because of the smaller content of radially-projecting loops, the yarn had a more regular, lean appearance and a reduced air drag (hence, a higher value for the air drag factor). The air drag factor for the corresponding yarn was 2.24 compared with 67 for the yarn of this invention.

*Example 5.*—The yarn of this example had the appearance of a soft cotton yarn, possessed a good covering power and made up into fabrics having a soft and warm handle. The air drag factor for the corresponding yarn was 1.33.

*Example 6.*—A photomicrograph of a length of the yarn is shown in FIGURE 19. Once again, the yarn contained a reduced content of radially-projecting loops compared with the corresponding yarn and this was reflected in the values for the air drag factor. The corresponding yarn had an air drag factor of 1.35 while the yarn of Example 6 had an air drag factor of 34.

FIGURE 20 shows in graphical form the difference between the air drag of yarns of this invention and the air drag of corresponding yarn and it also shows the effect of increasing denier on the air drag.

The air drag was measured in the manner described previously by incorporating a length of the yarn in a pendulum arrangement and setting the pendulum in motion. The number, or fraction of swings which occurred between an amplitude of 30° and 20° was determined in an appropriate manner. The number found was the measured air drag. This number was then plotted on a graph against the denier of the yarn.

The three points lying along the curve A were derived from the yarns of Example 4, 5 and 6 respectively, while the three points lying along the curve B, were derived from the corresponding yarns.

The reduced content of radially-projecting loops in the yarns of Examples 4–6 (Curve A) compared with the corresponding yarns (Curve B) conveys to them a lower air drag and consequently, a higher value for the number of swings between the two amplitudes. The yarns of Curve A have a higher value for the measured air drag since this parameter is expressed herein by the number of swings, but they have the lower actual air drag.

The dotted line between the curves A and B indicates the dividing line, in terms of the measured air drag, between the yarns of this invention and the corresponding yarns obtained under identical process conditions except that the sleeve assembled around the godet is withdrawn along the rotational axis in one direction without eversion Yarns having a measured air drag lying within the upper region of the graph have air drag factors of 7.5 or more.

Point C on the graph is the measured air drag of a 208 denier polyethyleneterephthalate spun staple yarn. The air drag factor for this, as with many other spun staple yarns is in excess of the value of 7.5 and they are equivalent in this respect to the yarns of this invention. Points D and E represent the measured air drag of a 159 denier polyethyleneterephthalate continuous filament and a 192 denier polypropylene continuous filament respectively. Owing to their smooth surfaces which characteristically have few projecting elements, the measured air drag is high i.e. their actual air drag is low because of the reduced damping.

Example 7

The apparatus of Example 2 was employed in the preparation of a yarn composed of polyethyleneterephthalate filaments. The pertinent dimensions and distances were the same as in that example.

Polyethylene terephthalate having an inherent viscosity of 0.675 (measured in orthochlorophenol at 25° C. and at a concentration of 0.8%) and containing 0.3 percent titanium dioxide as a delustrant was extruded into filaments at a spinning temperature of 280–290° C. Three of the polyethylene terephthalate filaments were led through the traverse mechanism operating at 2,000 cycles per minute and an amplitudes of 1.5 inches onto the godet rotating at 24,000 r.p.m. The sleeve formed on the godet and which comprised a plurality of interconnected helices arranged in superimposed layers was continuously pulled off the godet by a constant speed wind up device along the axis of rotation thereof, when it collapsed and simultaneously elongated in the axial direction into a strand of loops. This strand of loops was twisted into a yarn in which form it was wound up at a rate of 120 f.p.m.

The yarn so obtained had the following properties.

| | |
|---|---|
| Denier | 29.5 |
| Twist (t.p.i.) | 16 |
| Twist factor | 1.28 |
| Tenacity (gms./denier) | 1.01 |
| Extensibility (percent) | 104 |
| Air drag factor | 9.7 |
| Bulk factor (percent) | 4.7 |

Individual filament in the yarn had a denier of 1.22 and a birefringence of 0.139.

Examples 8–11

Employing the apparatus assembly of Example 2, yarns were prepared from the various melt-spinnable polymers reported in Table 2 which also included the relevant operation conditions and some of the properties of the yarns.

All the polymers contained 0.3 percent titanium dioxide as a delustrant, and the inherent viscosities of the polymers were measured in the same manner as the polyhexamethylene adipamide of Example 2.

Notes on Table 2

*Example 8.*—The yarn has an enhanced sparkle effect owing to the trilobal shape of the constituent filaments. The corresponding yarn had an air drag factor of 3.0.

*Examples 9 and 10.*—The yarns had the handle and feel of a spun yarn made from the equivalent staple fibre and a comparable bulk. The corresponding yarns had air drag factors of 3.10 and 1.88 respectively.

*Example 11.*—The polyamide composite filament was composed of equal proportions by weight of polyhexamethylene adipamide as one component and an 80/20 random copolymer of polyhexamethylene adipamide and polyepsilon caprolactam as the other component. The two components were arranged side-by-side along the length of the filament.

Example 12

A polyhexamethylene adipamide filament made in the manner set forth in Example 2 was processed into a yarn using the apparatus assembly of that example. The godet was rotated at a constant speed of 18,000 r.p.m. and the sleeve formed therein withdrawn along the axis of rotation and wound up as a yarn at a speed of 80 f.p.m. During the operation of the process the traverse frequency was reduced in stages by alteration of the rotational speed of the motor driving the crank and the

TABLE 2

| Example | Polymer | Spinning conditions | | | | | |
|---|---|---|---|---|---|---|---|
| | | I.V. | Sping. Temp. (° C.) | Rate, lbs./hr. orifice | Filament Shape | No. of Filaments | Traverse frequency, c.p.m. |
| 8 | Polyhexamethylene adipamide | 0.982 | 290 | 0.05 | Trilobal | 4 | 2,000 |
| 9 | Polyepsilon caprolactam | 0.810 | 270 | 0.06 | Circular | 3 | 2,000 |
| 10 | Polyhexamethylene suberamide | 0.851 | 280 | 0.06 | do | 5 | 2,000 |
| 11 | A polyamide composite filament | 0.88 | 290 | 0.06 | do | 3 | 2,000 |

| Example | Peripheral speed of godet (ft./min.) | Wind-up speed (ft./min.) | Yarn properties | | | | | Filament properties | |
|---|---|---|---|---|---|---|---|---|---|
| | | | Denier | Twist factor | Tenacity (gm./den.) | Extensibility | Air drag factor | Bulk Factor | Denier | Birefringence |
| 8 | 9,200 | 80 | 590 | 6.0 | 0.64 | 64.5 | 29.8 | 4.6 | 3.5 | 0.036 |
| 9 | 9,200 | 80 | 455 | 5.4 | 1.12 | 58.5 | 20 | 3.2 | 1.6 | 0.037 |
| 10 | 9,200 | 80 | 718 | 7.1 | 1.2 | 92.7 | 20.5 | 4.4 | 1.4 | 0.036 |
| 11 | 9,200 | 80 | 406 | 5.2 | 0.96 | 41.4 | 26.6 | 3.5 | 1.9 | 0.039 | effect of the various traverse speeds in the process and the resulting yarn was determined. The conclusions are summarised in Table 3 below.

TABLE 3

| Traverse frequency, cycles per minute | Process | Nature of yarn |
|---|---|---|
| 4,500 | Smooth running, good withdrawal of sleeve in an orderly and progressive manner. | Good regularity with few radially-projecting loops. |
| 3,500 | do | Still regular and with few radially-projecting loops. |
| 2,500 | do | Do. |
| 1,000 | "Snatching" during withdrawal which is less ordered. | Yarn begins to assume a slubbed appearance. Less regular. |
| 650 | Snatching very prevalent and continuous running difficult. | Yarn very slubby in appearance, owing to its irregularity it is of limited utility. |

Many types of filaments are suitable for the yarn of this invention and the process described has been operated successfully for the production of bulky continuous filament yarns from a wide variety of polymeric materials. For example, suitable filaments are prepared from fibre-forming polyamides such as polyhexamethylene adipamide, polyepsilon caprolactam and poly-omega-aminoundecanoic acid, polyesters, such as polyethylene terephthalate, cellulosics, such as cellulose acetate or triacetate, polyacrylics, vinyl polymers, vinylidene polymers, polyurethanes, polyhydrocarbons, and so on. Composite filaments, and filaments derived from blends of polymeric materials may also be used.

Preferred among these polymers are the melt-spinnable ones, which are drawn at spinning and in the same operation by which they are pulled down onto the rotating body.

While the present apparatus and process are suitable for operation with filaments having a normal cross-section such as those produced where a spinneret having circular shaped orifices is employed for the spinning thereof, filaments having a non-circular cross-section are also suitable, for instance the trilobal shaped polyhexamethylene adipamide filaments of Example 10, and may impart desirable effects to fabrics derived therefrom.

An acceptable yarn with good bulk characteristics can be derived from a single filament although many more filaments, generally not more than 50, can also be employed.

From the foregoing, it will be appreciated that the advantages of this invention are manifold. The bulky yarns, and the fabrics into which such yarns are made up, will tend to have those properties, notably handle or feel, covering power and warmth, normally associated with spun stable yarn structures. In addition, the properties inherent in the material forming the continuous filaments will be present, for example, the hard wearing, good strength and no-rotting characteristics associated for example with polyamide yarns and fabrics. The yarns can readily be handled by conventional textile machinery and have been woven and knitted into useful fabrics. The fabrics, on account of the bulk of the yarns from which they are made, have a good warmth and covering power.

The bulky yarn is simply and economically prepared by a process which only requires extremely simple equipment and which is fully integrated with the spinning of the continuous filaments from a source material. The process utilises extremely fine denier continuous filaments to produce a bulky yarn of a greatly enhanced denier containing numerous filaments in its cross-section and one in which the bulkiness is inherent in its construction and is stable in the subsequent processing of the yarns into fabrics without the necessity of a heat-setting treatment.

The terms "air drag factor," "bulk factor" and "twist factor" as used in the claiming clauses hereinafter are to be construed in the light of the definitions and explanatory matter given hereinbefore.

What we claim is:

1. A continuous filament yarn comprising a multiplicity of interconnected loops arranged essentially parallel to the longitudinal axis of the yarn in the form of a relatively compact core with a number of generally shorter length loops which emerge from the core wrapped around the said core.

2. A continuous filament yarn as claimed in claim 1 wherein many of the loops are contained for at least part of their length within another loop.

3. A continuous filament yarn comprising a multiplicity of interconnected loops arranged essentially parallel to the longitudinal axis of the yarn and forming a relatively compact core, said yarn further comprising a distinct, thin, discontinuous sheath about said core defined by a plurality of said loops which are generally shorter length loops and which emerge from said core, said shorter length loops being helically wrapped around said core.

No references cited.

MERVIN STEIN, Primary Examiner

WERNER H. SCHROEDER, Assistant Examiner

U.S. Cl. X.R.

57—144